United States Patent [19]

Atherton et al.

[11] 3,878,870
[45] Apr. 22, 1975

[54] ORIFICE DESIGN FOR THE CONTROL OF COUPLED REGION FLOW

[75] Inventors: Richard Atherton; Peter R. Spadaro, both of Pittsburgh, Pa.; Frank G. Brummerhop, Baton Rouge, La.

[73] Assignee: The United States of America as represented by the United States Atomic Energy Commission, Washington, D.C.

[22] Filed: Apr. 16, 1974

[21] Appl. No.: 461,316

[52] U.S. Cl. .................. 138/42; 176/43; 176/61
[51] Int. Cl. ............................................ F15d 1/10
[58] Field of Search ....................... 138/40–42, 138/44; 176/43, 61

[56] References Cited
UNITED STATES PATENTS

| | | | |
|---|---|---|---|
| 2,219,637 | 10/1940 | Selgman et al. | 138/40 |
| 3,060,111 | 10/1962 | Sherman et al. | 176/43 X |
| 3,545,492 | 12/1970 | Scheid, Jr. | 138/44 X |
| 3,572,391 | 3/1971 | Hirsch | 138/41 X |
| 3,665,965 | 5/1972 | Baumann | 138/42 |

*Primary Examiner*—John W. Huckert
*Assistant Examiner*—Charles Gorenstein
*Attorney, Agent, or Firm*—John A. Horan; Kenneth L. Cage

[57] ABSTRACT

A fluid system arrangement for nuclear reactors comprising a triplate orifice apparatus which simultaneously controls core flow distribution, flow rate ratio between hydraulically coupled regions of the blanket and radial static pressure gradients entering and leaving the blanket fuel region. The design of the apparatus is based on the parameters of the diameter of the orifice holes, the friction factor, and expansion, contraction and turning pressure loss coefficients of the geometry of each orifice region. These above parameters are properly matched to provide the desired pressure drop, flow split and negligible cross flow at the interface of standard and power-flattened open lattice blanket regions.

3 Claims, 15 Drawing Figures

TYPE 1 MODULE – 3 REQ'D
TYPE 2 MODULE – 3 REQ'D
TYPE 3 MODULE – 6 REQ'D
TYPE 4 MODULE – 9 REQ'D
TYPE 5 MODULE – 6 REQ'D

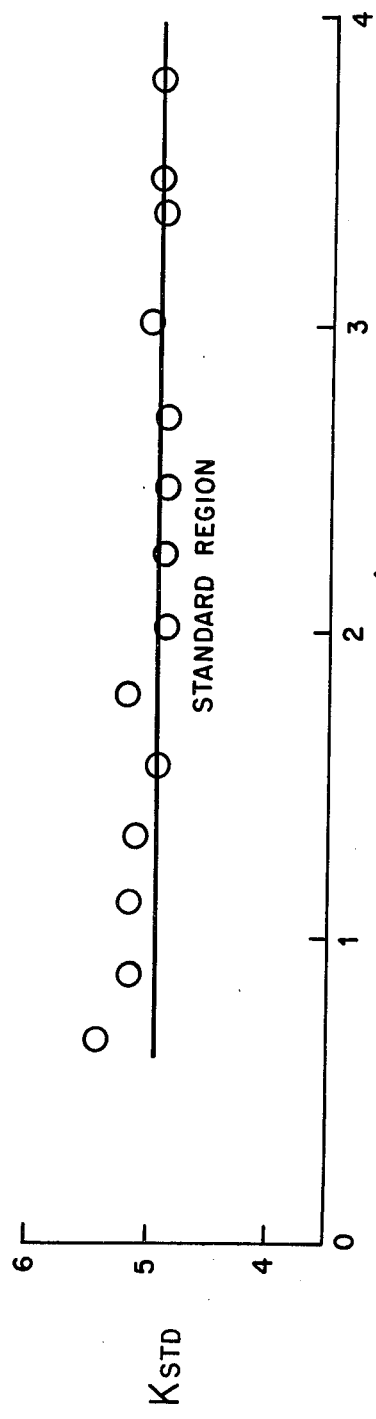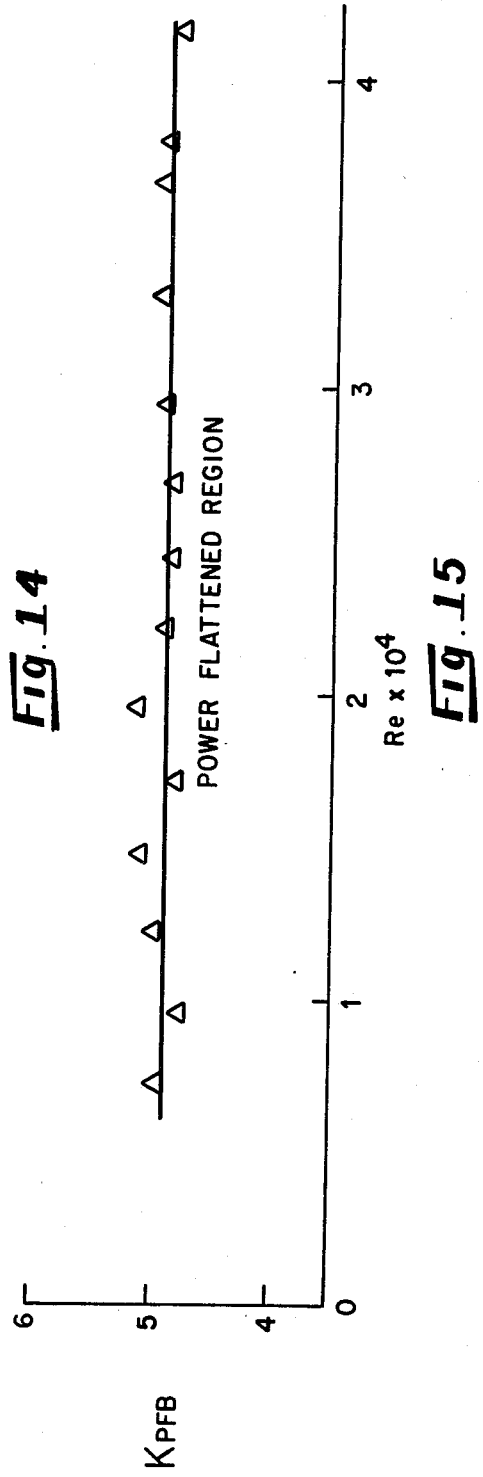

ORIFICE DESIGN FOR THE CONTROL OF COUPLED REGION FLOW

BACKGROUND OF THE INVENTION

The invention described herein was made in the course of, or under, a contract with the U.S. Atomic Energy Commission.

Field of the Invention

This invention relates to fluid flow applications and more particularly to a fluid flow application utilizing triplate orifices in fuel regions of a nuclear reactor.

Description of the Prior Art

U.S. Pat. No. 2,708,656 issued to E. Fermi, et al., on May 17, 1955 sets forth the particular nomenclature associated with nuclear reactors and is hereby incorporated by reference. The *Nuclear Engineering Handbook*, edited by Harold Etherington, published by McGraw-Hill Inc., (1958), sets forth at Subchapter 9-2 entitled "Fluid Flow and Reactor Systems," Subsection 7 the reasons for incorporating orifices within nuclear reaction flow channels. The Shippingport Pressurized Water Reactor, prepared for the United States Atomic Energy Commission, Addison-Wesley Publishing Co., Inc., (1958) describes at Chapter 4 orifice units for a seed-blanket Shippingport Type Reactor. U.S. Pat. No. 3,060,111 issued to J. Sherman, et al., on Oct. 23, 1962 sets forth a detailed description of variable orifice device used in a Shippingport Type Reactor.

The primary function of the triplate orifices disclosed herein is to provide an additional core pressure drop necessary to achieve the required design flow of coolant distribution in the seed, blanket and reflector regions of a nuclear reactor. The introduction of additional pressure drop in the core blanket and reflector region is necessary because the flow area in these regions is significantly greater than in the seed region. Thus, without additional resistance added to the blanket and reflectors, the flow would be maldistributed in the core such that the seed region would receive inadequate primary coolant while the coolant in the blanket and the reflector region would be excessive.

Furthermore, coolant design distribution can be complex as in a Light Water Breeder Reactor (LWBR) because the design flow rates and velocities in standard and power-flattening blanket regions are significantly different (i.e., 13 ft per sec vs. 16 ft per sec respectively). U.S. Pat. No. 3,634,084 issued to Richard C. Shank, et al., on Feb. 8, 1972 sets forth in detail the relationship between standard and power-flattening blanket regions in a LWBR. Since the standard and power-flattening blanket regions have no physical barrier therebetween, they are in direct hydraulic communication resulting in coupled region flow. Coupled region flow is defined as the flow in any two adjacent regions having different geometry, flow area, or fluid velocity where the regions are in direct hydraulic communication (i.e., in the absence of physical boundaries between the regions, the fluid flow is free to cross back and forth from one region to another). Any significant amount of cross flow is detrimental to the core thermal performance, and consequently, it is desirable to design a system which has essentially zero cross flow while maintaining the different design velocities in the hydraulically coupled open lattice standard and power-flattening blanket regions characteristic of a LWBR.

It was not recognized by persons skilled in hydraulic art that the parameters of hydraulic diameter of the orifice hole, friction factor, and expansion, contractions and turning pressure loss coefficients of the specific orifice geometry control in each region control (1) core flow distribution; (2) flow rate ratio and cross flow between standard and power-flattening blanket regions and (3) radial static pressure regions in the blanket region at the fuel entrance and exit.

It became necessary to develop a core flow distribution control system in accordance with a set of guidelines formulated to meet a particular core design objective and functional requirements. Although, these guidelines apply to a coupled flow region of a LWBR, it is obvious to one skilled in the art they are applicable to other coupled flow regions in reactors or in other fluid flow applications corresponding to the guidelines. They can best be summarized as follows:

1. Core Axial Pressure Drop: Since the seed region has significantly less flow area, additional resistance must be included at the top and bottom of the blanket and reflector region to assure design flow distribution in all three regions of a reactor core.

2. Flow Rate Ratios: The design flow rate ratio between the open lattice standard and power-flattening blanket region which are hydraulic coupled, must be constant with Reynolds number over the range of operating flow rates for the LWBR.

3. Radial Static Pressure Gradients: The radial static pressure gradient across the blanket, particularly in the coupled region, must be sufficiently small so that the net effect of this gradient, as a forcing function to either drive cross flow or generate unacceptable transverse loads on the fuel rods or grids, is insignificant.

4. Cross Flow: Cross flow must be insignificant or zero. As defined above, any significant amount of cross flow in the blanket region of a LWBR and particularly between the standard and power-flattening region is highly undesirable because it represents a departure from design flow rates and is a measure of the unavailability of primary coolant water for heat removal. Furthermore, it is extremely important to preclude cross flow from the triplate orifice as a forcing function which could probably result in hydraulically induced fuel rod bowing or vibration. Thus, the present of a significant amount of cross flow would result in an adverse affect on the performance capability of the core.

5. Flow Distribution: Flow distribution within each region of the core must be uniform and in accordance with the design requirements.

6. Crud Disposition: Hole diameters in the orifice must be of sufficient size to eliminate crud effects on pressure loss coefficients over the operating lifetime of the core.

7. Space Limitations: The resistance necessary in the blanket and reflector region to provide core design distribution must be accomplished within the limited space available at the entrance and exit of these fuel regions. Thus, a large pressure drop must be provided in a small space.

8. Maximum Velocity Limitations: The maximum average velocity in the holes of the orifices must be limited to approximately 30 feet per second.

9. Mechanical Requirements: The design must be mechanically feasible, within the acceptable stress limits, and reasonably easy and inexpensive to fabricate.

Hence, it can be readily seen that these guidelines impose stringent constraints to design an acceptable orifice device for use in a LWBR, other reactors, or other fluid flow applications. Several types of conventional orifices designs were considered but were rejected in view of the above guidelines. Examples of designs considered and rejected were: the single plate orifice where the maximum flow velocity would be substantially in excess of 30 feet per second; the variable flow resistance multihole orifice plates in series design was incompatable with the hex configuration of the LWBR and would fail to meet the required flow rate ratio, the insignificant or zero cross-flow requirement, space limitations, and maximum velocity limitations; and the staggered multihole orifices in series design as used in the Shippingport pressurized water reactor blanket patent was rejected on the inability to meet the flow rate ratio and crossflow requirements.

Thus, it became apparent if all the guidelines enumerated above were to be met, particularly the cross-flow requirements considered the crux of the problem due to unknowns and uncertainties associated therewith, a new type orifice device was needed.

SUMMARY OF THE INVENTION

This invention is based on the use of triplate orifices consisting of three plates in series with uniform spacing between them and an unique arrangement of holes located at the top and bottom of the hydraulically coupled standard and power-flattening blanket fuel regions. By judicious selection of the hole diameters in the standard and power-flattening blanket region, the axial pressure drop, flow rate ratio, static pressure gradients, and crossflow between the regions can be controlled over the operating range of core flow rates despite the hydraulic couplings between these regions. The orifices consist of three multihole flate plates of approximately three-eighths of an inch in the blanket and five-eighths of an inch in the reflector. Each of the three plates have a triangular hole pattern with identical spacing between the holes and hereinafter referred to as pitch. The hole pattern in the middle plate is staggered with respect to the outer plates to obtain maximum turning pressure loss coefficients.

Therefore, it is a primary object of this invention to provide an orifice device which would control the flow distribution, flow rate ratio between standard and power-flattening blanket regions, radial static pressure gradients and crossflow at the interface of the standard and power-flattening regions.

It is also an object of the present invention to provide an orifice device having a constant pressure loss coefficient as a function of Reynolds number over the range of operating flow rates.

It is also an object of the present invention to provide a sufficiently small radial static pressure gradient across the blanket.

It is also an object of this invention to provide an orifice device having openings of sufficient size to eliminate crud effects on pressure loss coefficients over the operating lifetime of the core.

It is also an object of this invention to provide an orifice device assuring uniform flow distribution within each region of the core.

BRIEF DESCRIPTION OF THE DRAWINGS

FIG. 14 and 15 shows the flow split (R) vs. the flow rate for standard and power-flattening blanket regions respectively with and without crossflow dividers.

DESCRIPTION OF THE PREFERRED EMBODIMENT

The invention can best be understood by reference to the above mentioned drawings for the particular nomenclature in detail associated with the LWBR. Reference is made to copending application Ser. No. 461,475 (AEC Case S-42,403) filed by Fauth et al., on Apr. 16, 1974 describing the mechanical features of the LWBR.

Figure 1:
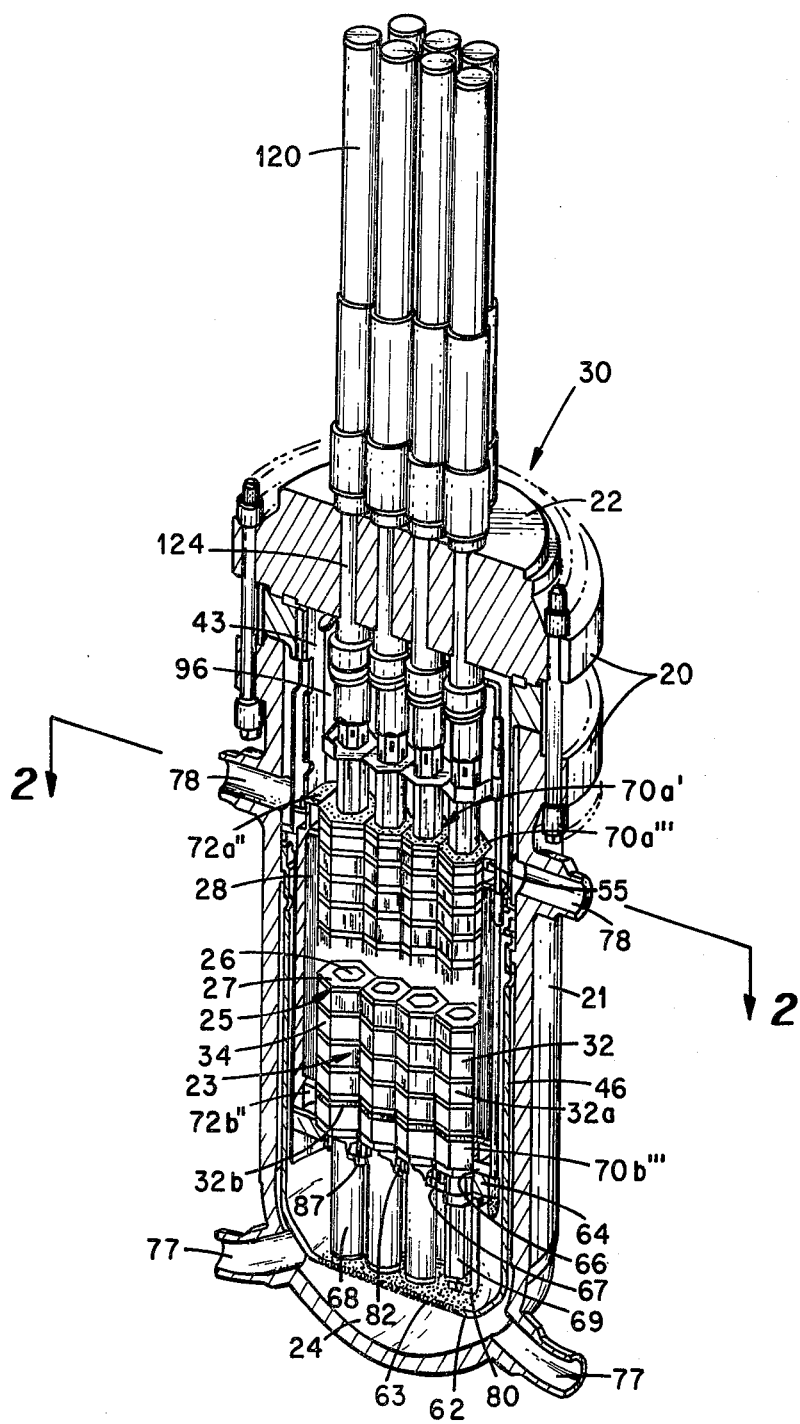
FIG. 1 is a vertical cross section of a perspective view of a nuclear reactor incorporating the features of the present invention.
Figure 2:
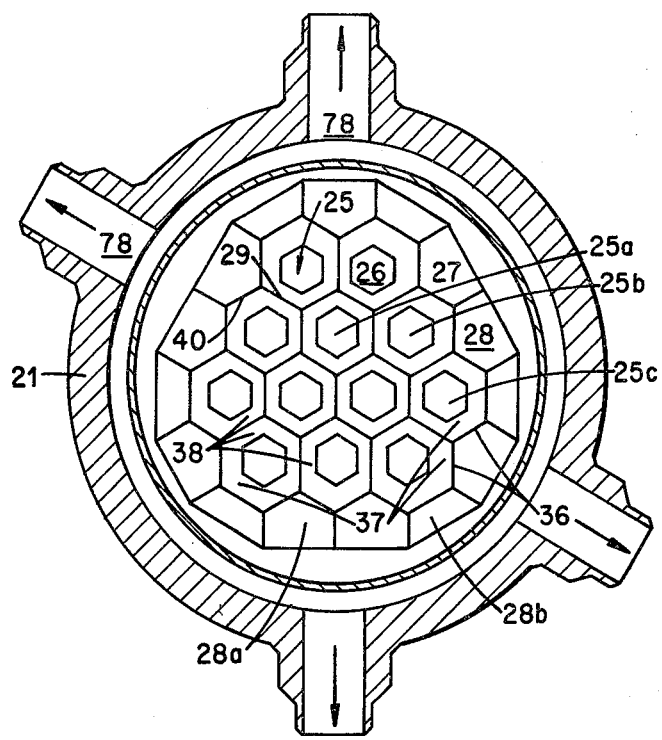
FIG. 2 is a horizontal cross sectional view taken along line 2—2 of FIG. 1.

As shown in FIG. 1 and 2 a reactor 30 having fuel assemblies with coolant channels therein, incorporating the orifice design of the present invention, comprises a pressure vessel 20, including a vessel shell 21 and a closure head 22, a core 23 contained in vessel shell 21 and a lower plenum chamber 24 in the bottom of vessel shell 21. The reactor 23 contains hexagonal-shaped fuel modules 25 comprising hexagonal shaped seed fuel assemblies 26 disposed generally within the fuel module center, and generally hexagonal shaped blanket fuel assemblies 27 disposed around the seed assemblies 26 and a plurality of reflector modules 28 surrounding the periphery of the grouped fuel modules 25.

The fuel modules 25a, 25b, and 25c, shown in FIG. 2 comprise Type 1, Type 2, and Type 3 modules respectively with Type 2 and Type 3 modules having two and three extending hexagonal flats 36 respectively forming the power-flattening regions 37 described in the aforecited Shank, et al., patent. No physical barrier separates fuel rods 32a in the standard region from the interface with the power-flattening blanket region fuel rods 32b. The reflector modules 28a and 28b are shown as Type 4 and Type 5 modules respectively.

The hexagonal fuel modules 25 have each side 29 arranged in a justapositioned relationship with a side 29 adjacent fuel modules 25 or a side 40 of a reflector module 28. The seed assemblies 26 are moved longitudinally with respect to the blanket assemblies 27 by control mechanisms 120. The blanket assemblies 27 are supported by a plurality of blanket support tubes 124 which are suspended from the closure head 22. The seed assemblies 26 are supported by the control mechanisms 120 which move these seed assemblies 26 longitudinally. The reflector modules 28 are supported by a seal ring 55, as described in the above referenced Fauth et al application. The upward hydraulic forces on the reflector assemblies 28 caused by the water flowing through the reflector assemblies 28 are resisted by hold-down barrel 43 which transmits the hydraulic forces to the closure head 22. A flow baffle 62 having a plurality of openings 63 therein is formed as an integral part of the lower core barrel 46.

A bottom plate assembly 64 affixed to the lower core barrel 46 has a plurality of openings 65 around its periphery to receive reflector assemblies 28. A plurality of generally hexagonal indentations 66 extend partially through the assembly 64 in accordance with the fuel module pattern shown in FIG. 2. Round openings 67 are centrally located within hexagonal indentations 66 through the bottom plate assembly 64.

The hexagonal indentations 66 receive the lower end of the blanket assemblies 27 of the fuel modules 25 and openings 67 receive a round extension 68 of seed assembly 26. A lower hexagonal extension 69 connects to a round seed extension 68 and extends downwardly from the bottom plate assembly 64. A seed flowmeter 80 is positioned within and interlocked to the round extension 68. Blanket flowmeters 82 are aligned with the blanket assemblies 27 and are bolted to the lower face 87 of the bottom plate assembly 64. A top and bottom blanket assembly triplate orifice 70a and 70b are respectively positioned above and below the blanket assembly fuel rods 32. Similarly, top and bottom reflector assembly triplate orifices 72a and 72b are positioned above and below fuel rods 34.

The pressure vessel shell 21 is provided with four inlet nozzles 77 uniformly spaced thereabout and communicating with the lower plenum chamber. As noted above, the coolant flow rate is greater in the power-flattening blanket region than the standard blanket region. The coolant flow is supplied by four pumps (not shown) which circulate through the pressure vessel 20, exiting through four outlet nozzles 78 (not uniformly spaced) and through four separate loops (not shown) each of which contains a pump (not shown) and a heat exchanger (not shown). In more detail the coolant flowing through blanket assembly 27 enters in nozzle 77, passes through openings 63 of flow baffle 62, enters flowmeter 82 in the blanket region into orifice 70b, passes along fuel rods 32 into orifice 70a, enters upper plenum region 96 and passes out of the vessel shell 21 via the outlet nozzles 78. The blanket triplate orifice for the standard fuel module, hereinafter referred to as Type 1 blanket orifice, is indicated by numeral 70'. The power-flattening fuel module blanket triplate orifice hereinafter referred to as Type 2 and Type 3 blanket orifices. The Type 3 blanket orifice is indicated by numeral 70'''. The Type 2 orifice (not shown) incorporates the same features as the Type 3 70''' blanket orifice hereinafter illustrated. The reflector triplate orifices hereinafter referred to as Type 4 and Type 5 reflector orifices, are respectively indicated by numerals 72' and 72''.

Figure 3:
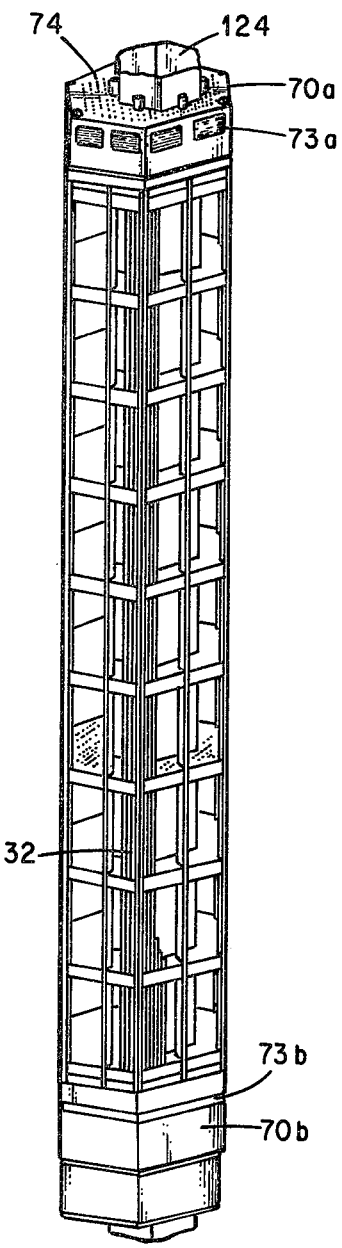
FIG. 3 is a perspective view of a standard and power-flattening blanket region as shown in FIG. 1.
Figure 4:
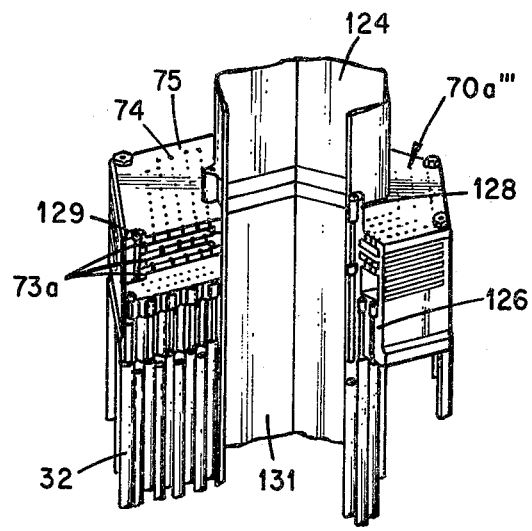
FIG. 4 is an enlarged partial cross section of the top portion of the blanket and power-flattening region shown in FIG. 3 illustrating the top triplate orifice.
Figure 5:
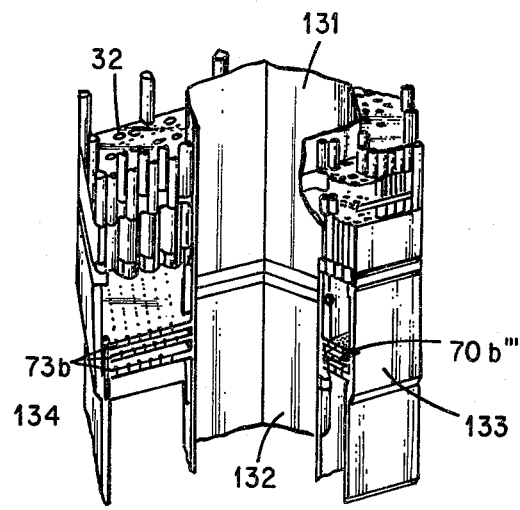
FIG. 5 is an enlarged partial cross section of the lower portion of the blanket and power-flattening region shown in FIG. 3 illustrating the bottom triplate orifice.

Referring to FIG. 3, 4 and 5, the triplate orifices 70a and 70b in the blanket consists of a series of three flate plates 73a and 73b of approximately three-eighths of an inch thick having a plurality of holes 74 that are positioned to provide a nomimal space of approximately one-half of an inch between each plate. Each of the three plates 73 have a triangular hole pattern with identical spacing or pitch between the holes 74. The hole pattern in the middle plate is staggered with respect to the two outer plates 74 to obtain maximum turning pressure loss coefficients.

As shown in FIG. 4, the Type 3 orifice plates 70a''' are mounted around a guide tube 131 connected to the blanket support tubes 124. The interior and exterior of the orifice 70a''' are respectively affixed to the blanket support tube 124 and base plate 126 by stud 128 and bolt 129. The top orifice plate bolts 129, holds the three orifice plates 70a''' in line above the top end of the blanket rods 32.

FIG. 5 shows a similar plate arrangement with the Type 3 bottom orifice 70b''' being located around a guide tube extension 132. The staggered hole pattern in the middle plate 73b is clearly shown in FIG. 5, which maximizes turning pressure loss coefficients. Thus, a resistance can be achieved in a small space without an excessive flow velocity. The interior and exterior of the orifice 70b''' are respectively affixed to guide tube extension 132 and external stub tube 133 by bolts 134. The size in each orifice 70 of the holes 74 as hereafter described vary depending on orifice location in the core, the desired pressure drop, and the flow rate within and flow split between the standard and power-flattening blanket region for the Type 2 and Type 3 blanket modules.

Figure 6:
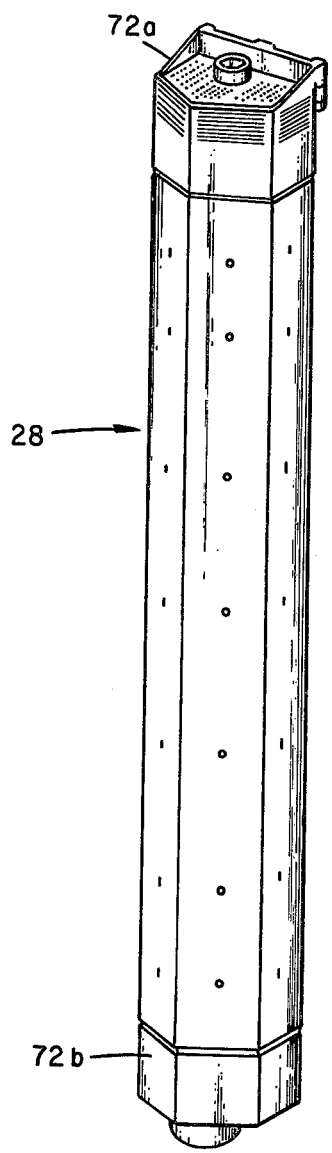
FIG. 6 is an enlarged perspective view of a reflector assembly shown in FIG. 1.
Figure 7:
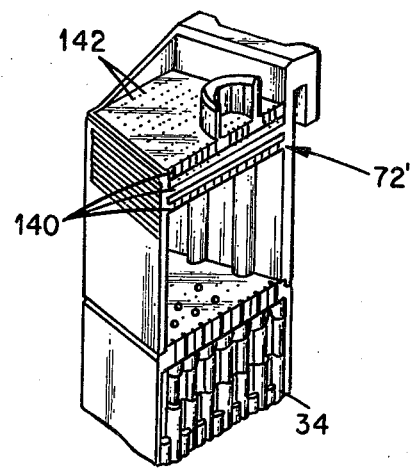
FIG. 7 is an enlarged cross sectional view of the top portion of the reflector assembly shown in FIG. 6 illustrating the top triplate reflector orifice.
Figure 8:
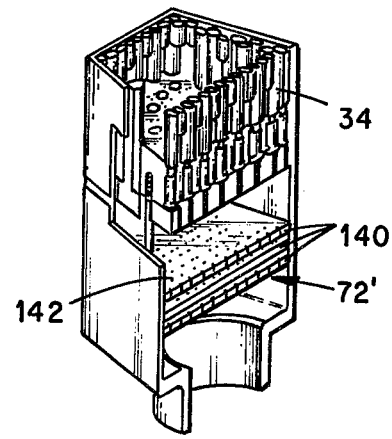
FIG. 8 is an enlarged cross sectional view of the bottom portion of the reflector assembly shown in FIG. 1 and FIG. 6 illustrating the bottom triplate orifice.

FIG. 6, FIG. 7, and FIG. 8 illustrate top and bottom triplate orifices 72a and 72b for the reflector assembly 28 and their respective locations and position in regard to the fuel rods. Each orifice 72' comprises a series of plates 140 of approximately three-eights of an inch thick having a plurality of holes 142 that are positioned to provide a nominal space of approximately one-half of an inch between each plate. Each of the plates 140 have a triangular hole pattern with identical spacing or pitch between the holes 142.

The total number of modules, the region and module type and location in the LWBR are summarized in Table I.

TABLE I

IDENTIFICATION OF WHERE THE TRIPLATE ORIFICE INVENTION IS USED IN LWBR

| Reactor Core Region | No. of Modules | Module Type and Location Number | Triplate Orifice (where used)* |
|---|---|---|---|
| Blanket | 3 | I — 1, 2, 3 | Above and below fuel region in each module |
| Blanket | 3 | II — 1, 2, 3 | Above and below fuel region in each module |
| Blanket | 6 | III — 1, 2, 3 | Above and below |

TABLE I-Continued

IDENTIFICATION OF WHERE THE TRIPLATE ORIFICE INVENTION IS USED IN LWBR

| Reactor Core Region | No. of Modules | Module Type and Location Number | Triplate Orifice (where used)* |
|---|---|---|---|
| | | 4, 5, 6 | fuel region in each module |
| Reflector | 9 | IV — 1 thru 9 | Above and below fuel region in each module |
| Reflector | 6 | V — 1 thru 6 | Above and below fuel region in each module |
| Total | 27 | | |

*This is further illustrated in FIGS. 1 thru 8

The uniqueness of this invention comes about because there exists for each Type 2 and Type 3 fuel module one specific flow area per standard region and one specific flow area per power-flattening region together with one specific flow area ratio between the regions to provide the design flow distribution within the aforelisted stringent constraints composed by the guidelines and particularly flowrate ratio, radial static pressure gradient, and crossflow and maximum velocity limitations. As well known in the art, many complex three dimensional hydraulic parameters as pressure loss coefficients, flow patterns, etc., which are unique to triplate orifice designs are not amenable to mathematical analysis.

Figure 12:
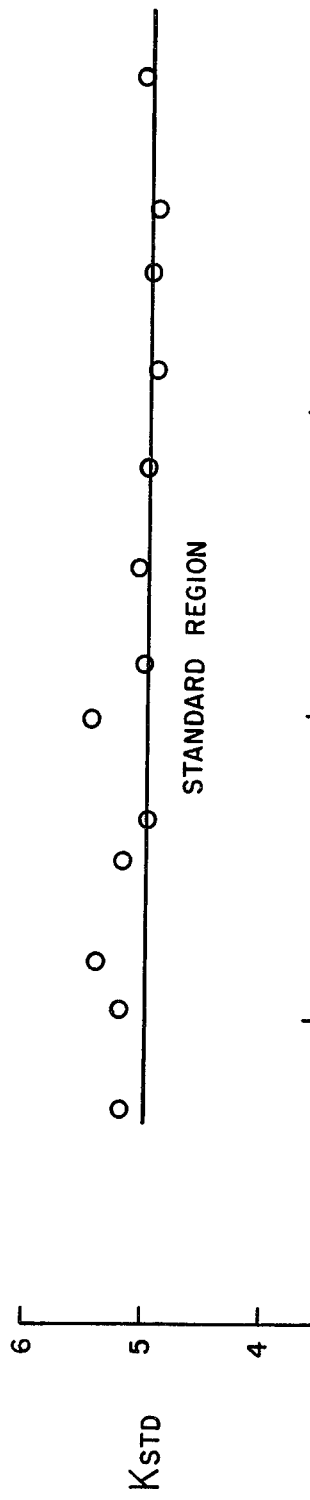
FIG. 12 and 13 shows the triplate orifice pressure loss coefficient vs. Reynolds number (Re) for the standard and power-flattening blanket regions respectively without flow dividers to permit natural cross-flow between the regions.
Figure 13:
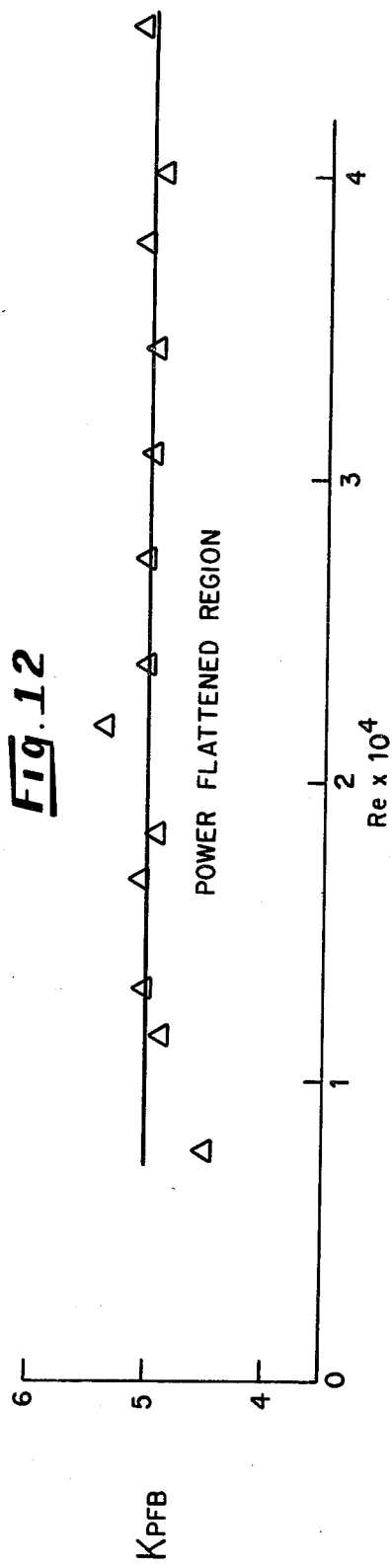

Table II describes representative various triplate orifice designs and in particular notes the average number of holes per plate, fflow hole pitch, plates spacing and thickness.

ficients (K) in both the standard and power-flattening region are constant as a function of Reynolds number (Re). Furthermore as shown in FIG. 12 and 13, the pressure loss coefficient (K) for the same No. 1 geometry as a function of Reynolds number (Re) is independent of the presence or absence of divider plates. Thus, the pressure drop across the triple orifice can be adequately controlled by the triplate orifice design and will behave in a predictable manner in the LWBR over the operational range of reactor flow rates. This provides design assurance that the module core flow distribution can adequately be controlled.

Referring to FIG. 14 and 15, the flow rate ratio or flow split of the No. 1 orifice geometry remains constant as a function of Reynolds number (Re) with or without flow dividers. The flow split is defined as the ratio of standard region flow to power-flattening region flow. A comparison of the two curves presented in FIG. 14 and 15, shows that there was no significant difference in the flow split between the regions with and without flow dividers. Thus, the flow rate ratio or flow split between the hydraulically coupled standard and power-flattening blanket regions, within the Type 2 and Type 3 modules, are controlled with the triplate orifice design and will behave in a predictable manner in the LWBR over the operational range of the reactor flow rates.

The size of the holes vary depending on the triplate orifice location in the core, the desired pressure drop, and the flow rate within and flow split between the standard and power-flattening blanket region for the Type 2 and Type 3 blanket modules. For plates of 0.375 inches at 0.505 inches apart at a triangular pitch

TABLE II

DESCRIPTION OF TYPICAL TRIPLATE ORIFICE GEOMETRY

| No. | Average Number of Holes per Plate | | Flow Hole Size (in.) | | Ratio of PFB/ Std Hole Dia. | Flow Hole Pitch Triangular (in.) | Spacing Between Plates (in.) | Thickness of Plates* | | |
|---|---|---|---|---|---|---|---|---|---|---|
| | Std. | PFB | Std. | PFB | | | | 1 | 2 | 3 |
| 1 | 125.7 | 352.7 | 0.214 | 0.214 | 1:1 | 0.631 | 0.505 | 0.375 | 0.375 | 0.375 |
| 2 | 125.7 | 352.7 | 0.271 | 0.271 | 1:1 | 0.631 | 0.505 | 0.375 | 0.375 | 0.375 |
| 3 | 125.7 | 352.7 | 0.271 | 0.294 | 1:1.09 | 0.631 | 0.505 | 0.375 | 0.375 | 0.375 |
| 4 | 125.7 | 352.7 | 0.271 | 0.315 | 1:1.16 | 0.631 | 0.505 | 0.375 | 0.375 | 0.375 |
| 5 | 125.7 | 352.7 | 0.311 | 0.352 | 1:1.13 | 0.631 | 0.505 | 0.375 | 0.375 | 0.375 |
| 6 | 125.7 | 352.7 | 0.343 | 0.380 | 1:1.11 | 0.631 | 0.505 | 0.375 | 0.375 | 0.375 |
| 7 | 125.7 | 352.7 | 0.378 | 0.419 | 1:1.11 | 0.631 | 0.505 | 0.375 | 0.375 | 0.375 |

*Plates 1, 2, 3 are the bottom, center and top plates of the triple orifice respectively.

Figure 9:
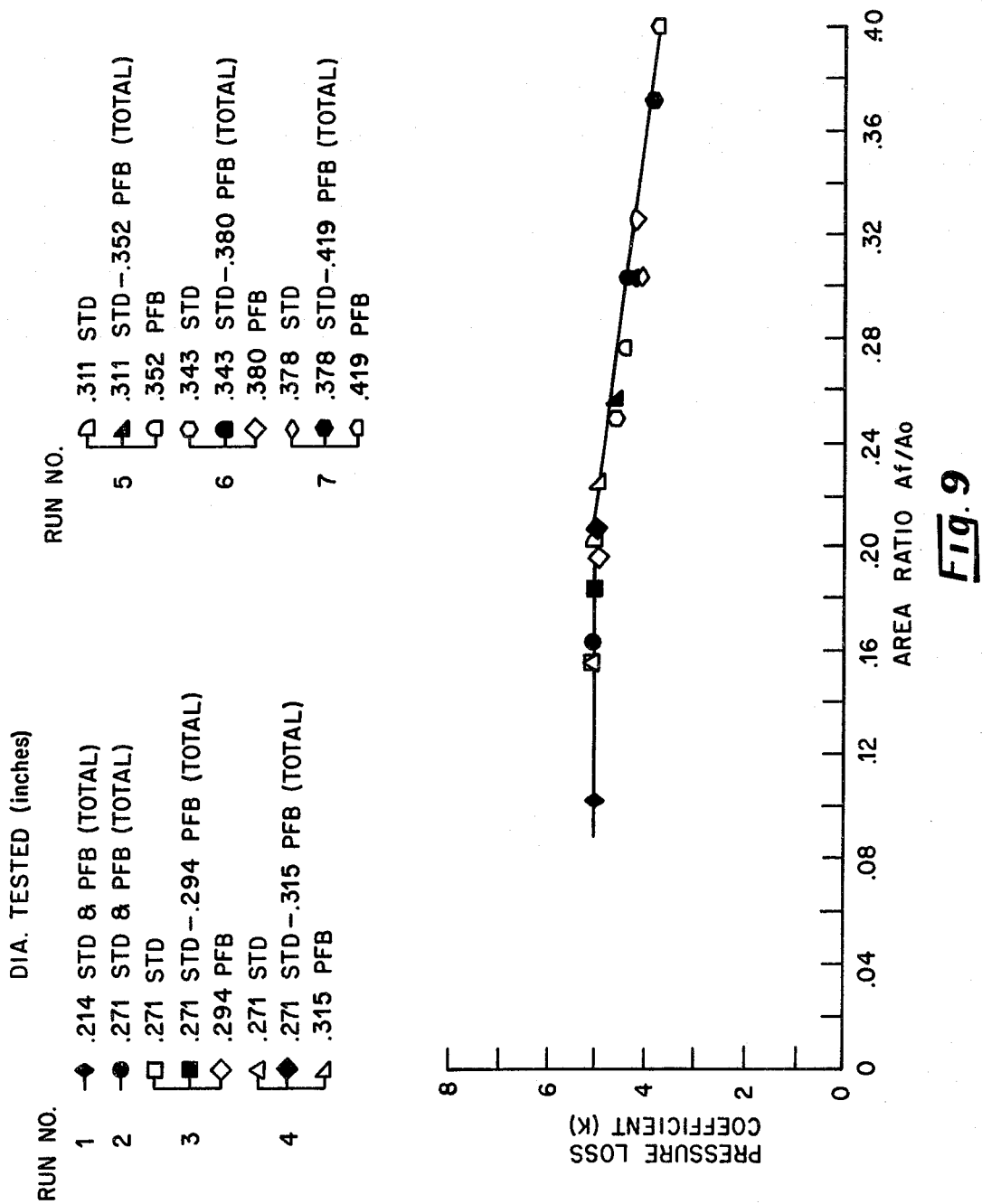
FIG. 9 is a plot of triplate orifice pressure loss coefficient (K) versus area ratio (Af/Ao).

FIG. 9 is a plot of triplate orifice pressure loss coefficient (K) verses area ratio (Af/Ao) for each orifice plate geometry listed in Table II. The area ratio is defined as the ratio of the average area of the holes per plate of the triplate orifice to the area just upstream of the orifice plates. To calculate the area ratios of the individual regions (i.e., standard and power-flattening) the average area per plate and the upstream areas in the individual regions were ratioed. For each flow hole diameter listed in Table II, the pressure loss coefficients (K) for the individual regions and the combined regions are shown in FIG. 9. The preferred standard, power-flattening, and total area ratios range from 0.08:1 to 0.40:1. Accordingly, for the desired pressure loss coefficient, the particular area ratio defining a particular hole size, and pitch is selected from FIG. 9.

Figure 10:
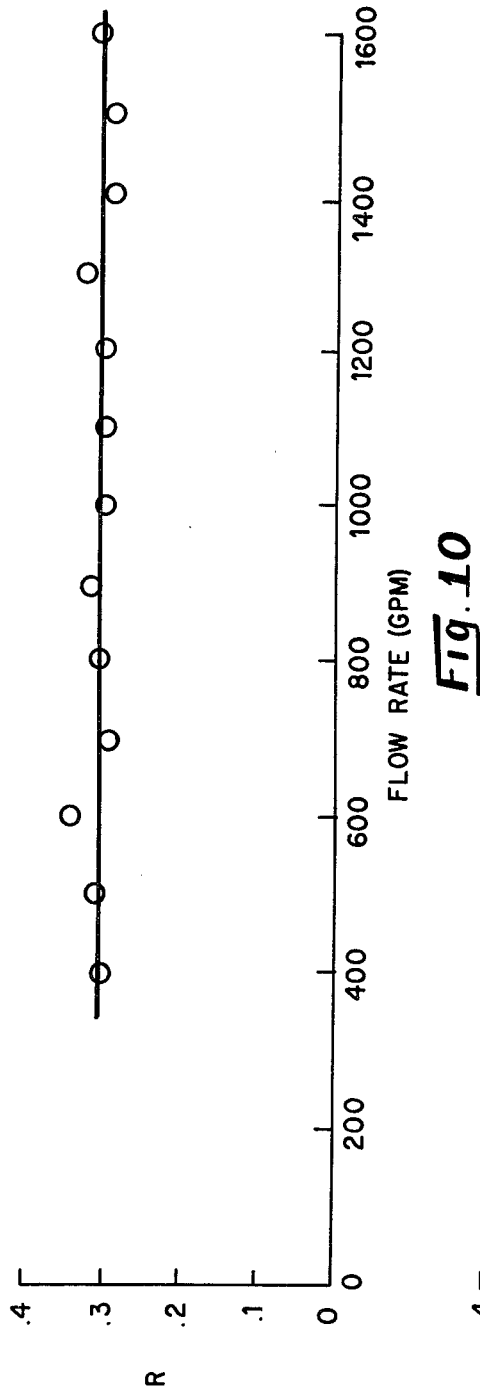
FIG. 10 and 11 shows the triplate orifice plate loss coefficient (K) versus Reynolds number (Re) for a standard and power-flattening blanket region respectively with flow dividers therebetween to restrict crossflow.
Figure 11:
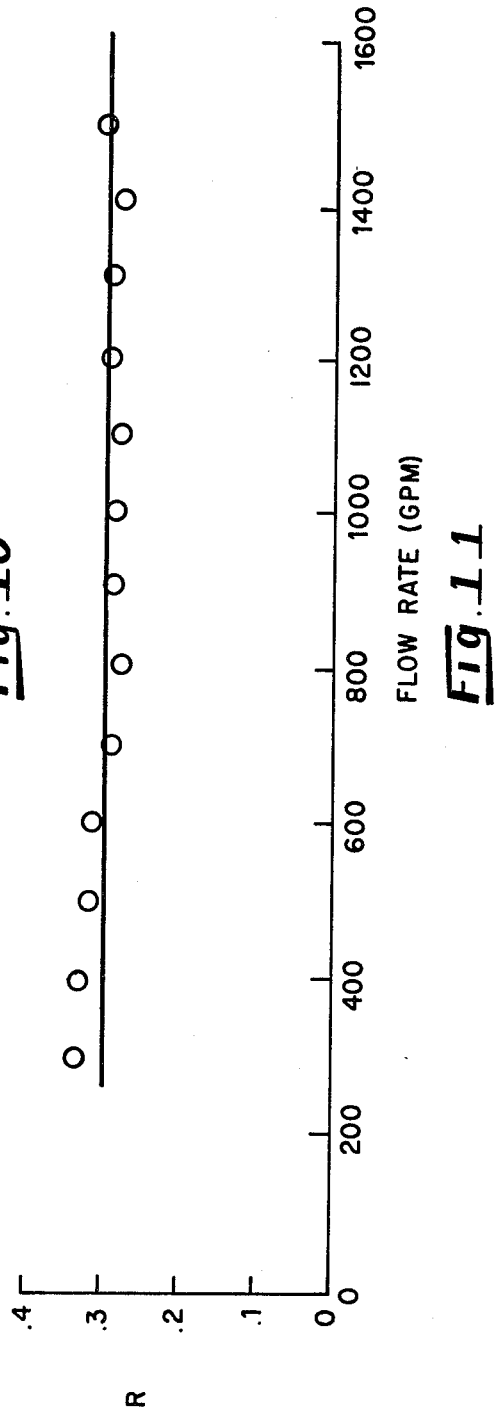

As indicated in FIG. 10 and FIG. 11 at a selected pressure loss coefficient as defined by orifice geometry No. 1 of Table II, the triplate orifice pressure loss coefof 0.631 the hole size in each, can range from 0.214 to 0.419 inch diameter with a power-flattening to standard hole diameter ratio from 1:1 to 1:1:16. However, it is important that each plate having the same thickness, flow hole configuration, and, flow hole pitch have the same flow hole size, as large differences in size between upstream plate and two downstream plates may cause the pressure loss coefficient to vary with flow rate. As indicated in Table II, the preferred hole sizes are from 0.214 to 0.419 inches with a power-flattening to standard hole diameter ratio from 1:1 to 1:1:16. The only limitation on the staggered alignment of the middle plate is that the hole pattern be positioned so as to be non-aligned or overlapping with the aligned hole pattern of the top and bottom orifice plates. In this manner, desired turning pressure losses are achieved.

Thus, it should be noted that this invention is not limited in the application to only the LWBR or other nuclear reactors, but would be particularly well suited for general use in general flow application such as liquid, liquid metal, liquid solids or gas where the guidelines listed above are prime consideration. It should be recognized that the above described invention accomplishes the objects of simultaneously and adequately controlling the axial pressure drop, flow rate ratio, radial static pressure gradients, and most important negligible crossflow at the interface of the standard and power-flattened blanket region by utilizing the unique triplate arrangement in this invention.

The invention thus described should be considered limited only by the scope of the claims appended hereto.

We claim:

1. An orifice device for a nuclear reactor fluid flow channel disposed to transmit coupled fluid at least two different velocities in defined first and second regions of the channel; said device positioned at the inlet and outlet to the fluid flow channel and comprising three spaced apart flat plates each having a plurality of spaced cylindrical holes ranging in size from 0.214 to 0.419 inch diameter and arranged in a triangular pattern of identical pitch, said holes defining an area ratio from 0.08:1 to 0.40:1, the outer plates having an aligned hole pattern and the middle plate having a non-aligned hole pattern in respect to said outer plate pattern to define a plurality of cylindrical loci in parallel, non-intersecting paths, said plates having larger diameter holes in the greater velocity region than the holes in the lower velocity region, the diameter of said lower velocity holes to the diameter of said greater velocity holes defined in a ratio ranging from 1:1 to 1:1.16.

2. The orifice device defined in claim 1, wherein the flat plates are positioned about one-half of an inch apart, the pitch spacing is about 0.631 inch, the holes have a diameter ranging from 0.214 to 0.419 inch and the ratio of the diameter of said lower velocity holes to the diameter of said greater velocity holes ranging from unity to 1.16.

3. The orifice plates defined in claim 1, wherein the orifice plate holes in the lower and greater velocity regions are respectively 0.271 and 0.294 inches diameter.

* * * * *